US006398462B1

(12) United States Patent
Fulkerson

(10) Patent No.: US 6,398,462 B1
(45) Date of Patent: Jun. 4, 2002

(54) POWDER TRANSFER APPARATUS HAVING POWDER FLUIDIZING TUBE

(75) Inventor: Terrence M. Fulkerson, Parma, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/089,840

(22) Filed: Jun. 3, 1998

(51) Int. Cl.[7] ................................................ B65G 53/40

(52) U.S. Cl. ........................... 406/134; 406/39; 406/75; 406/136; 406/152; 406/141; 406/142; 406/138; 406/143; 406/153

(58) Field of Search ............................ 406/134, 39, 75, 406/136, 152, 141, 142, 138, 143, 153

(56) References Cited

U.S. PATENT DOCUMENTS

| | | | | |
|---|---|---|---|---|
| 4,018,185 A | | 4/1977 | Myers | 118/308 |
| 4,502,819 A | * | 3/1985 | Fujii et al. | 406/14 |
| 4,505,623 A | * | 3/1985 | Mulder | 406/114 |
| 4,618,295 A | * | 10/1986 | Dugge et al. | 406/138 |
| 4,770,344 A | * | 9/1988 | Kaiser | 239/8 |
| 4,945,956 A | * | 8/1990 | Bueyuekgueclue et al. | 141/67 |
| 5,017,053 A | * | 5/1991 | Sisk | 406/138 |
| 5,106,240 A | * | 4/1992 | Dirkse et al. | 406/138 |
| 5,271,695 A | * | 12/1993 | Bischof et al. | 406/114 |
| 5,487,624 A | * | 1/1996 | Toyota et al. | 406/14 |
| 5,518,344 A | | 5/1996 | Miller et al. | 406/39 |
| 5,567,468 A | * | 10/1996 | Lucas | 427/9 |
| 5,615,832 A | * | 4/1997 | Price | 239/8 |
| 5,615,980 A | * | 4/1997 | Mauchle | 406/19 |
| 5,654,042 A | * | 8/1997 | Watanabe et al. | 427/459 |
| 5,690,450 A | | 11/1997 | Miller et al. | 406/39 |
| 5,722,802 A | | 3/1998 | March | 406/46 |
| 5,846,031 A | * | 12/1998 | Rutz | 406/142 |
| 5,915,154 A | * | 6/1999 | Schoch et al. | 399/258 |
| 5,957,393 A | * | 9/1999 | Price | 239/654 |
| 5,971,207 A | * | 10/1999 | McDonough et al. | 222/1 |

FOREIGN PATENT DOCUMENTS

| | | | | |
|---|---|---|---|---|
| DE | 4423197 A1 | | 1/1996 |
| DE | 19652860 A | * | 6/1998 |
| EP | 0178120 A1 | | 4/1986 |
| EP | 0438976 A2 | | 7/1991 |
| EP | 0686430 A2 | | 12/1995 |

OTHER PUBLICATIONS

Nordson Corporation, *Fluidizing Adapted Kit Instruction Sheet*, P/N 303 787A, Dec. 1997.

Eurotec Surface Coating Systems Limited, *Eurotec™ Finish Systems*, Brochure, undated.

* cited by examiner

*Primary Examiner*—Christopher P. Ellis
*Assistant Examiner*—Jeffrey A. Shapiro
(74) *Attorney, Agent, or Firm*—Wood, Herron & Evans, L.L.P.

(57) ABSTRACT

An apparatus for emptying powder from a container, such as an original shipping box includes a support having a vibrating unit for loosening the powder within the container. A powder pick-up tube and an attached powder pump draw powder from the container and transfer the powder to a powder spray gun. The lower end of the pick-up tube includes a positively pressurized fluidization unit for locally fluidizing the powder at the pick-up tube inlet. The pressurized fluidization unit primarily assists in providing a consistent draw of powder up the pick-up tube.

28 Claims, 2 Drawing Sheets

POWDER TRANSFER APPARATUS HAVING POWDER FLUIDIZING TUBE

RELATED PATENTS

This application is related to improvements on apparatus disclosed and claimed in U.S. Pat. Nos. 5,518,344 and 5,690,450, (the '344 and '450 patents) each being assigned to the assignee of the present invention. The disclosures of these related patents are fully incorporated herein by reference.

FIELD OF THE INVENTION

The invention generally relates to apparatus and methods for unloading powder from a container, such as shipping containers or boxes. More specifically, the invention relates to improvements to a powder pick-up tube associated with such apparatus.

BACKGROUND OF THE INVENTION

As generally discussed in the above incorporated patents, electrostatic powder coating technology can involve the delivery of powder from a container to a spray gun. The container may be, for example, a shipping box or barrel or may be a separate fluidizing hopper. Generally, fluidizing hoppers may incorporate some type of pressurized air fluidization structure, usually including a porous plate or conduit structure disposed at the bottom of the hopper. The fluidizing action of pressurized air directed through the porous plate or conduit structure allows the powder to be drawn through a powder pump and directed to an attached powder spray coating gun.

Alternatively, as disclosed in the '344 and '450 patents, vibrating units may be used to vibrate a container or box of powder. This fluidizes the powder enough that the powder may be drawn up through a powder pick-up tube by a powder pump and then directed to the powder spray coating gun. In systems that employ vibrating units, the original shipping container, such as a box lined with a plastic bag, may be placed directly on the vibrating unit. In this instance, there is no need to transfer the powder from the original shipping container to a separate hopper. This is generally desirable in lower production facilities, such as small job shops, which do not require large powder supplies and which have not typically required the higher quality coatings that may be produced with air fluidized systems.

One problem associated with air fluidized systems is that the pressurized air can cause the powder to drift or become airborne above the container or hopper. Despite this drawback, increasing numbers of powder coating equipment users are demanding the consistent coatings or film builds that can be produced by these systems. This desire is being seen even in smaller job shops. To achieve this coating consistency, the powder spray coating gun must receive a consistent delivery of powder and pressurized air fluidization is known to help achieve this consistency.

One of the main problems associated with fluidizing powder in an original shipping container using pressurized air is that a separate pressurized air fluidizing unit or conduit system has been required at the bottom of the container adjacent to the lower inlet end of the pick-up tube. As mentioned above, these pressurized air fluidizing units can lead to powder drift out of the container and, for example, cause associated powder clean up problems. While the user may close off the container at the top, such as by closing the plastic liner or bag around the powder pick-up tube, this is not seen as an adequate solution.

The '344 and '450 patents disclose a double-walled powder pick-up tube having a lower closed end to alleviate clogging problems, for example, associated with the plastic liner. Also, a venting aperture and passage, connected to atmosphere, lead to the powder inlet end of the tube also to alleviate powder clogging problems typically experienced on start-up. Another related apparatus is disclosed in U.S. Pat. No. 4,505,623, also assigned to the assignee of the present invention. This apparatus also uses a double-walled powder pick-up tube and discloses the principle of drawing atmospheric air through the space between the two tubes for fluidizing powder at the powder inlet end. Like other prior devices, this apparatus does not adequately address the specific concerns of this invention.

Finally, powder pick-up tube structure including positively pressurized air for fluidization purposes is known. However, such powder pick-up tubes have included a porous annular fluidizing element connected to the exterior of the tube at the powder inlet end. The fluidizing air is therefore directed radially outward around the end of the pick-up tube and this can create various problems including those associated with powder drift from the container as mentioned above.

It would therefore be desirable to provide a powder pick-up tube and a pressurized air fluidization system that alleviates these and other concerns while providing much more consistent powder flow and film build on products.

SUMMARY OF THE INVENTION

The present invention therefore provides a powder pick-up tube connected to a source of negative air pressure, such as a conventional powder pump, for suctioning powder from a container. In accordance with the main advantage of this invention, the pick-up tube is further connected to a source of positive air pressure for providing positive air fluidization of the powder from a substantially enclosed and localized fluidizing element as the powder is suctioned into the powder pick-up tube. The source of positive air pressure is preferably the same source of air pressure used for operating a powder spray coating gun associated with the apparatus. In this way, the positively pressurized air may be sent to the powder pick-up tube only during activation or triggering of the spray gun. An air line connects to a passage in the powder pick-up tube and communicates with a location disposed adjacent to a powder inlet at one end of the tube. The tube includes a lengthwise passage therein leading to a powder outlet which is connected to the source of negative air pressure, such as a powder pump.

Preferably, the powder pick-up tube is a double walled tubular structure in which a first lengthwise internal passage is surrounded by a second, annular lengthwise passage. The first lengthwise passage is used as the powder pick-up passage, while the second lengthwise passage is supplied with positively pressurized fluidizing air. This second lengthwise passage has an air inlet and an air outlet. Preferably, the air outlet at least substantially surrounds the powder inlet of the first lengthwise passage.

Also in accordance with the invention, the air outlet preferably includes an air diffusing member, which may specifically take the form of a perforated or porous insert, such as a porous polymer or metal insert. The air diffusing member preferably has an outlet that directs positively pressurized air toward the powder inlet and is constructed and oriented such that the pressurized air is not directed radially outward with respect to the powder inlet in a substantial manner. More specifically, an air outlet surface is disposed generally at an angle directed toward the powder inlet.

As the positively pressurized air is introduced in the above described manner, localized powder fluidization occurs during suctioning of the powder into the tube. Also, movement of powder into the powder inlet of the pick-up tube is assisted by the specifically directed pressurized air. In the preferred embodiment, the pressurized air is almost completely drawn with the powder up the tube and therefore cannot cause powder drift out of the container. A flow regulating device may be connected to the air line that supplies the positively pressurized air proximate the powder inlet. This can ensure that pressurized air is directed to the powder pick-up tube at a preferred pressure range of about 2 psi to about 15 psi. More preferably, the air pressure is supplied to the pick-up tube at about 8–10 psi and the air has a flow rate of between about 0.5 cfm and about 3.0 cfm.

The invention further contemplates a method of supplying powder to a powder spray coater by way of the apparatus and powder pick-up tube structure generally described above. This method generally involves the steps of placing the inlet end of the tube into a container of powder and negatively pressurizing the first lengthwise passageway to draw powder from the container into the powder inlet. In accordance with the invention, positively pressurized air is directed through the air outlet and toward the powder inlet to fluidize the powder as the powder is drawn into the powder inlet. The method further contemplates additional steps including supplying the pressurized air through a diffusing member, such as a perforated or porous material.

These and other objects, advantages of the invention, and specific details of one preferred embodiment will become more readily apparent to those of ordinary skill upon review of the following detailed description taken in conjunction with the drawings.

DETAILED DESCRIPTION OF THE PREFERRED EMBODIMENT

Most of the major system components described herein are described in the above incorporated '344 and '450 patents. Therefore, a general description to facilitate the understanding of the improvements provided by this invention is appropriate. However, for any additional detail not specifically addressed herein or associated with the powder pick-up tube of this invention, reference may be made to the '344 and '450 patents.

Figure 1:
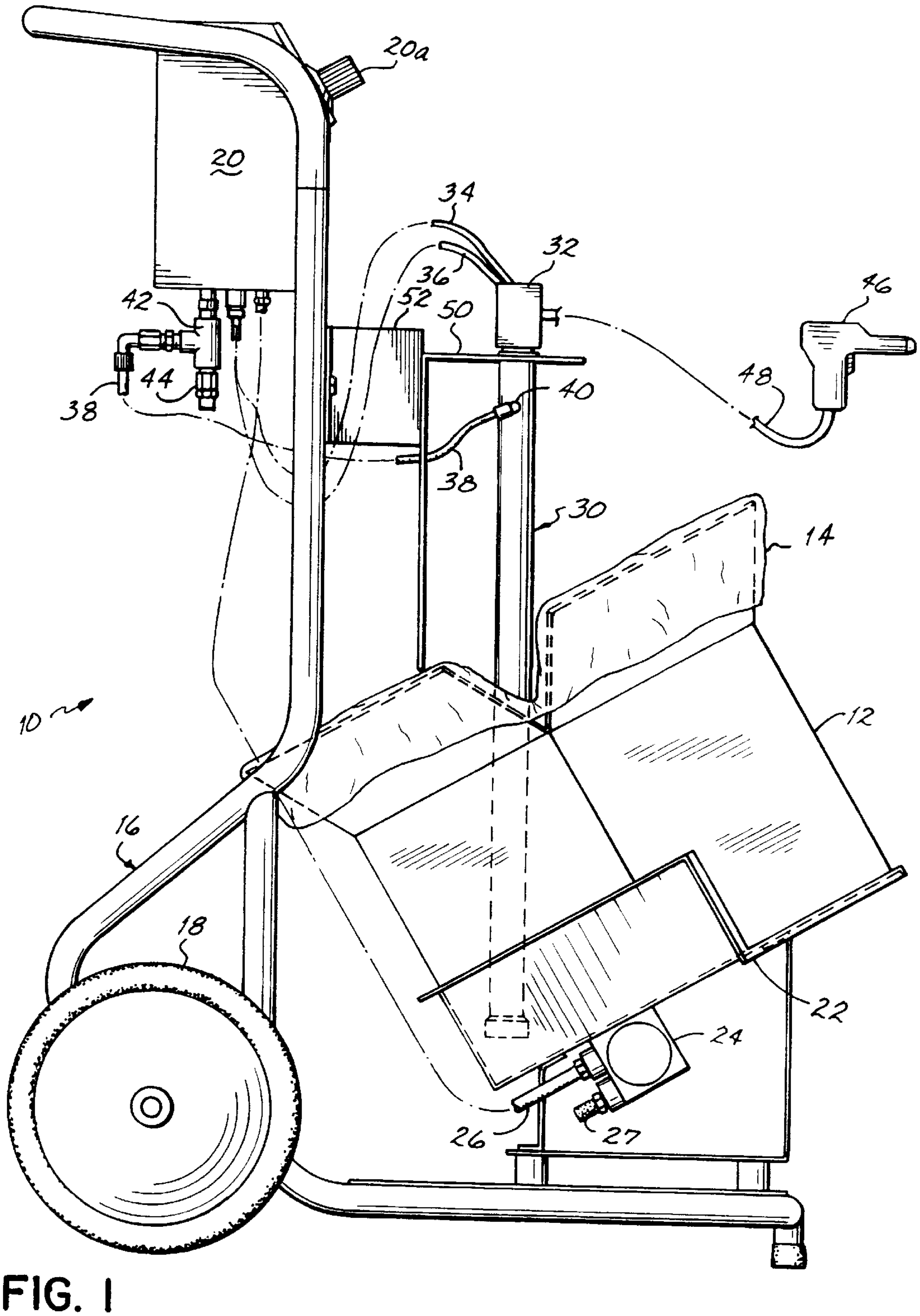
FIG. 1 is a side elevational view generally showing apparatus constructed in accordance with the invention.

Referring generally to FIG. 1, one specific and preferred apparatus 10 incorporating the present invention takes the form of a box unloader for transferring powder coating material contained therein. Although a box is shown, it will be appreciated that other types of containers may be used with this invention. Specifically, a box or shipping container 12, typically including an interior plastic liner or bag 14 filled with powder, may be unloaded using apparatus 10. Apparatus 10 comprises a support structure 16 which may include one or more wheels 18 for allowing easy transport by the user. A control unit 20 is used to control the operation of apparatus 10 in accordance with the descriptions given in the '344 and '450 patents. In the preferred embodiment, control unit 20 may be a VERSA-SPRAY II™ or a Sure Coat™ powder spray coating controller available from Nordson Corporation of Westlake, Ohio. Each of these control units includes an available positive pressurized air output which is triggered on by actuating a pilot valve (not shown) with a spray coating gun, as will be described. A cradle 22 includes an air operated vibrating unit 24, such as available from Vibco in Wyoming, R.I. When a container 12 is placed on cradle 22, vibrating unit 24 may be used to vibrate the powder contents of the container 12 to fluidize the contents and urge them to the lowest point in container 12. Vibrating unit 24 is connected to a triggered pressurized air output of control unit 20 by a conduit 26. The term "triggered" means that the air pressure is supplied when the associated coating gun is activated or triggered to dispense coating material, as will be discussed herein. Vibrating unit 24 also has a standard muffler 27.

A powder pick-up tube 30, constructed in accordance with the invention, is operatively connected to a powder pump 32, which may be of the type disclosed in the '344 and '450 patents. For example, in the preferred embodiment, powder pump 32 may be a Model 100 PLUS® pump manufactured by Nordson Corporation. Alternatively, pump 32 could be a model 224713 modular pump or a model 165633 powder transfer pump, each also available from Nordson Corporation. Such pumps typically include two triggered air line inputs, such as air lines 34, 36. One air line 34 is the flow rate air line and is directly connected to the pumping chamber which draws powder up pick-up tube 30 and into powder pump 32. Air line 36, on the other hand, is the diffusing or air atomizing air line and is connected to the diffuser chamber of the pump 32, in a conventional manner, to evenly mix or diffuse the powder within the air stream and to vary the output air/powder ratio of pump 32. Pick-up tube 30, as discussed below, is removably attached to the powder pump 32 in the same manner as described in the '344 and '450 patents. Another air line 38 provides positively pressurized air, for example, in a preferred range of 2 psi to 15 psi and most preferably at about 8 to about 10 psi. This air is supplied through an elbow fitting 40 to powder pick-up tube 30. The preferred flow rate is about 1.1 cfm, although one broader range may be from about 0.5 cfm to about 2 or 3 cfm depending on the application or other possible system components. Air line 38 is connected through a T-shaped fluid connector 42 to control unit 20 and, more specifically, to the same triggered air supply used for air line 26. T-shaped fluid connector 42 includes a flow restrictor which is preferably a 0.010 inch restrictor. This is designed to throttle typical shop air pressure of about 100 psi down to the preferred air pressure of 8–10 psi and flow rate of 1.1 cfm used for pick-up tube 30. Of course, other restrictors may be used and, for example, may be required if connecting to other air pressure sources. One optional source of triggered air pressure is pump 32. Typically, air pressure flowing to pump 32 is already reduced, for example, to about 50 psi. Therefore, a larger diameter air restrictor may be used in that application. Tubing or air line 38 may be conventional 6 mm plastic tubing.

As further shown in FIG. 1, a powder spray coating gun 46 receives the pressurized air and powder mixture from powder pump 32 via a supply line 48. Powder pick-up tube 30 and the attached powder pump 32 are preferably affixed to suitable support members, such as sheet metal supports 50, 52 attached to main support 16. Various controls 20*a* are provided on control unit 20, as generally discussed in the '344 and '450 patents, and as typically employed in powder spray controls such as the VERSA-SPRAY II™ or Sure Coat™ controllers. These adjust the pump flow rate and atomizing air pressures and the air pressure to vibrating unit 24, for example, using conventional air control components.

Figure 2:
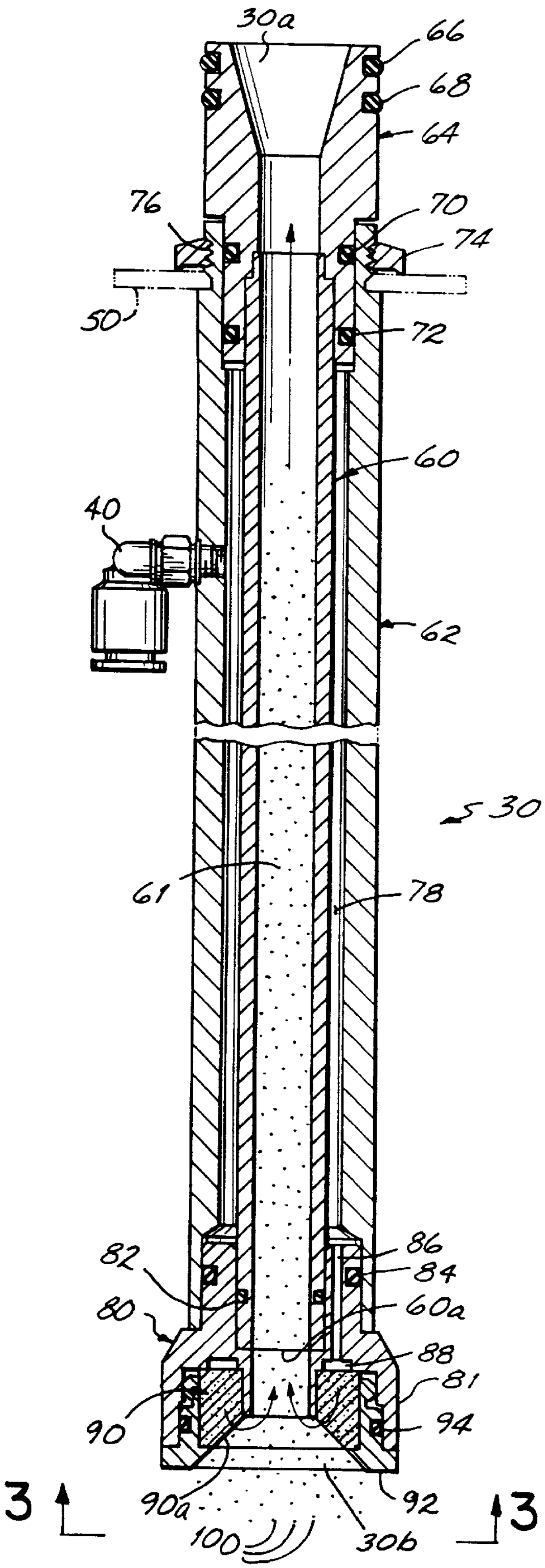
FIG. 2 is a longitudinal cross sectional view of the powder pick-up tube constructed in accordance with this invention.

More specifically referring to FIG. 2, powder pick-up tube 30 comprises an inner tube 60 and an outer tube 62. Inner tube 60 defines a lengthwise powder and air passageway 61 which is connected to pump 32 in the manner described in the '344 and '450 patents. An upper tubular connector member 64 receives inner tube 60 with a frictional or adhesive connection and includes respective sets of O-rings 66, 68 and 70, 72. O-rings 66, 68 facilitate a seal and frictional connection between an open powder outlet end 30*a* of powder pick-up tube 30 and powder pump 32 (FIG. 1). O-rings 70, 72 create a seal and a frictional connection between connector member 64 and outer tube 62. An internally threaded fastener 74 may be used to retain powder pick-up tube 30 removably suspended on support member 50 by being secured to external threads 76 on the upper end of outer tube 62.

Figure 3:
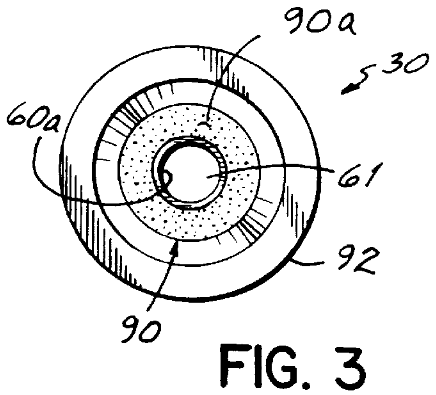
FIG. 3 is an end view of the powder pick-up tube taken generally in the direction indicated by line 3—3 of FIG. 2.

An annular space 78, defining a second lengthwise passageway in tube 30, is formed between inner tube 60 and outer tube 62 and communicates with a fluidization member 80 including an enclosure member 81 for supplying localized air pressure fluidization at a lower powder inlet end 60*a* of inner tube 60. While lengthwise passageway 78 is preferred, it will be appreciated that a passageway could be formed more directly at fluidization member 80 such as transversely through enclosure member 81. Enclosure member 81 is generally tubular and is secured and sealed with respect to both inner tube 60 and outer tube 62 by respective O-rings 82, 84. One or more orifices 86 are provided within enclosure member 81 to communicate between annular space 78 and an annular recess 88 formed in enclosure member 81. A diffusing member specifically in the form of a porous insert 90 is secured within the open end of enclosure member 81 and is disposed directly adjacent powder inlet end 30*b* of powder pick-up tube 30. This porous insert is held within enclosure member 81 by a retainer 92 forming part of fluidization member secured in place with a friction fit by an O-ring 94. Porous insert 90 at least substantially surrounds the powder inlet 60*a* of inner tube 60 and, most preferably, completely surrounds inlet 60*a* as shown in FIG. 3. It will also be noted that, in general accordance with the inventive principles, enclosure member 81 and retainer 92 ensure that insert 90 is substantially enclosed to ensure that positively pressurized air is concentrated at powder inlet 30*b*.

As further shown in FIG. 2, porous insert 90 includes a surface 90*a* angled generally toward powder inlet 60*a* such that positively pressurized air is also directed generally toward inlet 60*a*. This assists with directing powder 100 into inlet 60*a* and upwardly through inner tube 60. In the preferred embodiment, porous insert is preferably made from a porous polymer material by the name of PORON, which may be obtained from Porex Technologies of Fairburn, Ga. It will be appreciated that other diffusing members, such as porous, sintered or perforated diffusing structures may be appropriately used as well.

In operation, it will be appreciated that apparatus 10 operates generally similarly to the apparatus as described in the above incorporated '344 and '450 patents. This is with the exception that positively pressurized, fluidizing air is supplied through air line 38 and into annular space 78 any time powder coating gun 46 is activated by the user to substantially fluidize powder being suctioned into inlet 60*a*. That is, if pressurized air is sent to powder pump 32 and spray gun 46, positively pressurized air will be directed through air line 38 and into annular space 78 as air and powder are being drawn up through passageway 61 of inner tube 60. Specifically, this pressurized air will be directed into annular space 78, orifice 86, annular recess 88 and finally through porous insert 90. This pressurized air will therefore locally fluidize powder 100 at powder inlet 60*a* as powder 100 is being drawn into inner tube 60 by powder pump 32. The pressurized air is sufficient to locally fluidize powder 100 and assist in supplying a consistent amount of powder up inner tube 60. Also, powder drift from container 12 is prevented especially by directing the pressurized air generally toward the powder inlet 60*a* and thereby having the fluidizing air suctioned up tube 60 with powder 100.

While the present invention has been illustrated by a description of the preferred embodiment and while this embodiment has been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and methods as shown and described.

The invention itself should only be defined by the appended claims, wherein I claim:

1. Apparatus for delivering powder from a powder container to a powder spray coater, the apparatus including:

a source of negative air pressure;

a tube including a first lengthwise passage connected to the source of negative air pressure and having a powder inlet and a powder outlet, the powder inlet communicating between the outside of the tube and the first lengthwise passage such that powder located outside the tube may be suctioned through the powder inlet, into the first lengthwise passage, and through the powder outlet, fluidization structure connected with the tube adjacent the powder inlet and including a pressurized air outlet oriented generally toward the powder inlet to direct air generally down into the powder container and constructed to prevent substantial radially outward directed air flow from the air outlet, an air diffusing member located at the air outlet for diffusing the air discharged from the air outlet, and a source of positive air pressure connected to the air outlet for delivering positively pressurized air to the air outlet and fluidizing the powder as the powder is suctioned into the powder inlet by the negative air pressure.

2. The apparatus of claim 1, wherein the source of negative air pressure is a powder pump.

3. The apparatus of claim 1 further comprising a vibratory base unit for receiving the container of powder, whereby the container may be placed on the base unit and the tube may be disposed in the container as the container is vibrated by the base unit.

4. The apparatus of claim 1, wherein the source of positive air pressure is connected to a second lengthwise passageway in the tube communicating with the air outlet and wherein the air outlet surrounds the powder inlet.

5. The apparatus of claim 1, wherein the air diffusing member is an insert formed from a porous material and being substantially enclosed within the fluidization structure.

6. The apparatus of claim 1, wherein the air outlet and the air diffusing member surround the powder inlet.

7. The apparatus of claim 6, wherein the air diffusing member includes an outlet surface angled toward the powder inlet to direct pressurized air toward the powder inlet and thereby assist in directing powder into the first lengthwise passageway.

8. The apparatus of claim 1, wherein the tube is a double-walled tubular structure having an inner tube and an outer tube, the inner tube including the first lengthwise passageway and the source of positive air pressure being connected to a space formed between the inner tube and the outer tube.

9. The apparatus of claim 1 further comprising an air flow regulating device operatively connected to the source of positive air pressure to regulate the amount of air directed to the air outlet.

10. The apparatus of claim 1 further comprising a powder spray coating gun operatively connected to the powder outlet and further connected to the source of positive air pressure such that the positive air pressure may be used to eject powder from the gun.

11. The apparatus of claim 1, wherein the source of positive air pressure is a triggered air source which supplies air to the air outlet only when the gun is activated to eject powder.

12. Apparatus for dispensing powder in a powder spray coating system, the apparatus including:

a source of negative air pressure;

a tubular structure including a first lengthwise passage connected to the source of negative air pressure and having a powder inlet located generally at one end and a powder outlet generally at an opposite end, the powder inlet communicating between the outside of the tubular structure and the first lengthwise passage such that powder located outside the tubular structure may be suctioned by the negative air pressure through the powder inlet, into the first lengthwise passage, and through the powder outlet, a second passage in the tubular structure having an air inlet and an air outlet, the air outlet being disposed generally about and directed toward the powder inlet of the first lengthwise passage, and air diffusing structure disposed at the air outlet and adapted to diffuse and direct a supply of pressurized air from the second passage generally toward the powder inlet and constructed to prevent a substantial radially outward directed air flow from the air outlet relative to the powder inlet.

13. The apparatus of claim 12, wherein the source of negative air pressure is a powder pump.

14. The apparatus of claim 12 further comprising a vibratory base unit for receiving the container of powder, whereby the container may be placed on the base unit and the tube may be disposed in the container as the container is vibrated by the base unit.

15. The apparatus of claim 12, wherein the air diffusing structure includes an insert formed from a porous material.

16. The apparatus of claim 15, wherein the outlet opening and the insert fully surround the powder inlet.

17. The apparatus of claim 16, wherein the insert includes an angled outlet surface directed generally toward the powder inlet.

18. The apparatus of claim 16, wherein the tubular structure is a double-walled structure having an inner tube and an outer tube, the inner tube including the first lengthwise passageway and the air line being connected to a space forming the second passage between the inner tube and the outer tube.

19. The apparatus of claim 12 further comprising an air flow regulating device operatively connected to the air inlet.

20. The apparatus of claim 12 further comprising:

a source of positive air pressure connected to the second passage for delivering pressurized air through the air diffusing structure and thereby substantially fluidizing the powder as the powder is suctioned into the powder inlet by the negative air pressure.

21. The apparatus of claim 12, wherein the second passage is a lengthwise passage in the tubular structure.

22. A method of supplying powder to a powder spray coater by way of a tubular structure including a first lengthwise passageway having a powder inlet and a powder outlet and a second passage having an outlet disposed adjacent the powder inlet, the method comprising the steps of:

placing the inlet end of the tubular structure into a container of powder, negatively pressurizing the first lengthwise passageway to draw powder from the container into the powder inlet and through the first lengthwise passageway, supplying positively pressurized air from a pressurized air source through the outlet of the second passage through an air diffusing member, down into the powder in the container and directed toward and generally in surrounding relationship to the powder inlet, and preventing the positively pressurized air from being directed substantially in a radially outward direction from the outlet of the second passage relative to the powder inlet.

23. The method of claim 22, wherein the powder is directed from the first lengthwise passageway to a powder spray coating gun.

24. The method of claim 23, wherein the steps of negatively pressurizing the first lengthwise passageway and supplying positively pressurized air are each triggered by activation of the powder spray coating gun.

25. The method of claim 22 further comprising the step of vibrating the container of powder during the steps of negatively pressurizing the first lengthwise passageway and supplying positively pressurized air.

26. The method of claim 22, wherein the positively pressurized air is supplied to the second passageway at a pressure of between about 8 psi to about 15 psi and a flow rate of between about 0.5 cfm and about 3 cfm.

27. The apparatus of claim 1, wherein the fluidization structure prevents any air from flowing from the air outlet in a radially outward direction relative to the powder inlet.

28. The apparatus of claim 12, wherein the air diffusing structure prevents any air from flowing from the air outlet in a radially outward direction relative to the powder inlet.

* * * * *

UNITED STATES PATENT AND TRADEMARK OFFICE

CERTIFICATE OF CORRECTION

PATENT NO. : 6,398,462 B1
DATED : June 4, 2002
INVENTOR(S) : Terrence M. Fulkerson It is certified that error appears in the above-identified patent and that said Letters Patent is hereby corrected as shown below:

Column 5,
Line 40, after "member" insert -- 80 and --.

Column 8,
Line 1, change "16" to -- 12 --.

Signed and Sealed this

Twenty-fifth Day of March, 2003

JAMES E. ROGAN
*Director of the United States Patent and Trademark Office*